INVENTOR
JEAN PATOUILLET

BY
ATTORNEYS

United States Patent Office 3,785,953
Patented Jan. 15, 1974

3,785,953
PROCESS FOR CARRYING OUT ENDOTHERMIC CATALYTIC REACTIONS
Jean Patouillet, Paris, France, assignor to Societe Anonyme: Antar Petroles de l'Atlantique, Paris, France
Continuation-in-part of application Ser. No. 81,166, Oct. 15, 1970, which is a continuation of abandoned application Ser. No. 738,831, June 21, 1968. This application Nov. 9, 1971, Ser. No. 196,943
Int. Cl. C10g 39/00
U.S. Cl. 208—49                6 Claims

ABSTRACT OF THE DISCLOSURE

A reactor for carrying out endothermic reactions under substantially adibatic conditions comprising a plurality of tubes disposed vertically and a plurality of radiant heating means exterior to said tubes, means to introduce a gaseous feedstock into said tubes, said plurality of radiant heating means being disposed along said tubes in a vertical direction in spaced relationship dependent on the temperature of the endothermic reaction of said gaseous feedstock, at least part of said vertically disposed tubes defining catalyst zones, as well as the process for carrying out endothermic catalytic reactions in substantially endothermic conditions, consisting essentially in introducing the reaction stream into at least one catalysis zone consisting of at least one zone containing dilute catalyst and which can be preceded by a zone containing an inert catalyst support, the said dilute catalyst zone being followed by a conventional catalyst zone proper, each of said zones may further be separated from adjacent zones by intercalated zones containing no material, and/or positioning along the said zones a plurality of distinct heating means to provide variable amounts of heat to the reaction stream moving in each of said zones, the temperature within said stream being maintained substantially constant during its passage through the said zones.

REFERENCE TO PRIOR APPLICATIONS

This application is a continuation-in-part of my co-pending United States patent application Ser. No. 81,166, filed Oct. 15, 1970, now abandoned which application in turn is a streamlined continuation of United States patent application Ser. No. 738,831, filed June 21, 1968, now abandoned.

THE PRIOR ART

In many industrial processes the reactions used catalytically are overall endothermic. A temperature drop therefore occurs during the catalytic reaction and the temperature gradients vary with the catalysis zone. It is, therefore, necessary to compensate such differences in temperature during continuous operations in order to obtain optimum yields and products having uniform characteristics.

The teachings of the prior art will be made clear with greater precision by referring to the process for the catalytic reforming of petroleum fractions.

It will be recalled that this catalytic process for producing high octane gasolines and aromatic hydrocarbons uses various reactions which are, on the whole, endothermic. To this end large cylindrical reactors of considerable diameter are used, which contain the reaction catalyst, and into which the petroleum fractions are supplied.

Owing to the overall endothermism of the reaction a drop in temperature occurs during catalysis. This may be high and its extent depends, among others, on the reactivity of the petroleum fraction being treated, and particularly on the amount of naphthenes it contains.

The temperature drop depends, therefore, on the chemical characteristics of the feedstock. It also varies with the degree of intensity of the catalytic reaction during the operation. It is known that the temperature drop is greater in that part of the reactors where the petroleum fractions are supplied than at the outlet. An effort has therefore been made to overcome the drawback of this fall in temperature when the process is carried out by supplying the reaction feedstock with heat enabling the temperature to be raised to a temperature as near as possible to the optimum catalysis temperature.

Up to the present the prior art has not provided satisfactory means for maintaining an optimum catalysis temperature. Supplying the reactor system with an excess of heat enabling the system to store additional calories has been suggested. But this additional supply of heat must be limited, since if superheating is excessive it causes both partial thermal decomposition of the feedstock by cracking and deterioration of the catalyst.

If, on the other hand, the temperature is not raised sufficiently high the catalytic reactions do not occur under the most favorable conditions and yields are insufficient.

In the prior technique it was therefore suggested that more complex apparatus should be provided for carrying out the reforming process so that the catalytic temperature could be controlled. As an example, between each two adjacent reactors in a system containing a certain number of reactors, a furnace or heating circuit was positioned to raise the temperature of the reaction mixture to the predetermined value. Three or four reactors could thus be disposed in series, this involving two or three intermediate passages through the heating apparatus.

Another additional means used in the prior technique consists in providing two reactors in parallel when the feedstock is introduced so as to limit the temperature drop in each of them during the initial introduction of feedstock at which time the reaction possesses the greatest degree of reactivity.

A further additional means used in the prior technique utilizes quasi-isothermal conditions by a fluid transfer means for heat transfer which can be used for both endothermic and exothermic reactions. Equi-temperature (or quasi-isothermal) operations are carried out by successive heating operations after passing through each catalytic bed of undefined but relatively shallow depth, and not by an addition of heat as, and when, the reaction requires it (for endothermic reactions).

For this addition of heat, the conventional process uses burners, that is, partly the direct radiation of a flame and the rays reflected from surfaces, but mainly by convection exchange tubes containing the stream of vaporized hydrocarbons and gases. Owing to this, a special arrangement is required between each catalyst bed which is a real, small, tubular exchanger between the charge and the walls of the tube.

In order to obtain quasi-isothermal conditions, this process also requires a large number of successive reheatings so as not to fall into the drawbacks of the conventional process with several stages of reactors.

Apart from being more costly, such arrangements involve drawbacks due to the increased number of reactors or auxilliary reheaters and that said reactors should be of large diameter whereby preferential circulation paths of the feedstock are facilitated. This phenomenon occurs in all reactors in series and results in irregular use of the catalyst because, as is well known, certain catalyst zones wear out more quickly than others that are not substantially in operation.

OBJECTS OF THE INVENTION

An essential object of the process of the invention is to overcome the drawbacks of the prior technique that are summarized hereinabove, and it therefore provides a method for supplying heat to the reaction system as and when it is required, thus providing substantially adiabatic operation.

An object of the invention is, therefore, a process for carrying out endothermic catalytic reactions in substantially endothermic conditions, consisting essentially in introducing the reaction stream into at least one catalysis zone consisting of at least one zone containing dilute catalyst and which can be preceded by a zone containing an inert catalyst support, the said dilute catalyst zone being followed by a conventional catalyst zone proper, each of said zones may further be separated from adjacent zones by intercalated zones containing no material, and/or positioning along the said zones a plurality of distinct radiant heating means to provide variable amounts of heat to the reaction stream moving in each of said zones, the temperature within said stream being maintained substantially constant during its passage through the said zone.

Another object of the invention is the development of a reactor for carrying out endothermic reactions under substantially adiabatic conditions comprising a plurality of tubes disposed vertically and a plurality of radiant heating means exterior to said tubes, means to introduce a gaseous feedstock into said tubes, said plurality of radiant heating means being disposed along said tubes in a vertical direction in spaced relationship dependent on the temperature of the endothermic reaction of said gaseous feedstock, at least part of said vertically disposed tubes defining catalyst zones.

These and other objects of the invention will become more apparent as the description thereof proceeds.

THE DRAWINGS

DESCRIPTION OF THE INVENTION

Figure 2:
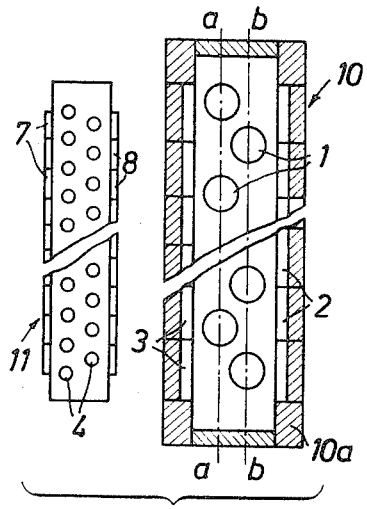
FIG. 2 is a larger scale transversal cross-sectional view along line II—II of FIG. 1.

This invention relates to a process and device for carrying out endothermic catalytic reactions in adiabatic conditions, and more particularly, the reaction known as catalytic reforming of petroleum fractions, to obtain gasoline having higher octane numbers and aromatic hydrocarbons.

Specifically, the invention relates to a process for conducting endothermic catalytic reactions in elongated reactors under substantially adiabatic conditions which consists essentially of passing the reaction stream into an elongated confined reaction path having at least one catalyst zone, dividing the exterior of said elongated confined reaction path into a plurality of separate zones, each of said separate zones having an independently controlled radiant heating means in cooperation therewith and adapted to supply variable amounts of heat radiantly through the exterior of said elongated confined reaction path to said reaction stream, at least one temperature sensing means located in said reaction stream in each of said plurality of separate zones, each of said temperature sensing means being in cooperation with each of said independently controlled radiant heating means and controlling the heat output of said heating means, whereby the temperature of said reaction stream is maintained substantially constant and equal to a predetermined value during its passage through said elongated confined reaction path as well as the apparatus for conducting the process.

The temperature to be maintained according to the invention can be determined by experience. It is not necessarily the same as the optimum theoretical catalysis temperature. The temperature should be selected to provide optimum conditions of yield and the best conditions for the catalyst and feedstock.

In the case of catalytic reforming this temperature lies in the range of 450° C. to 550° C.

According to one essential feature of the invention, independent radiant heating zones are provided exterior of the catalyst tubes.

According to the invention, the variable amount of heat supplied is determined in accordance with the internal temperature of the catalyst bed. These heating means may be adjusted in a known manner when both the internal temperature of the catalyst bed, such as can be measured by thermocouple, for instance, and the external temperature at a given portion of the tube are known.

The internal temperature of the catalyst bed may be taken as the reference temperature to be maintained for the reaction.

The control of an external temperature by a reference temperature is commonly carried out in the known technique for thermal regulation.

The means the invention offers as being most advantageous for heating the reaction system are radiant means such as electrical resistance wires in the form of a blanket around the tube, gas-fired radiants or electrical radiants. Electric coils can be provided on heat pipes thus enabling calories to be supplied to each pipe individually and to certain portions of each pipe. When separate radiant means are used, said radiant means can be located so that the heat flow is in contact with several tubes at the same time.

The invention does not exclude the possibility of supplying calories directly to the catalyst within the reaction pipes as, for instance, by passing hot gases through them. This latter heating method could be advantageous for pipes of relatively large diameter, but generally speaking the catalytic reforming process of the invention uses furnaces with relatively small diameter pipe. Such pipes are commonly from 100 to 250 mm. in diameter.

Generally speaking, with conventional pipe diameters, the transfer of heat from the exterior of the pipes to the feedstock and catalyst does not involve high temperature gradients.

The supply of exterior heat used in the invention enables adiabatic conditions to be reached which are satisfactory in practice, but such means can be advantageously combined with a special arrangement of the catalysis zones which is one of the additional essential characteristics of the process of the invention. The supply of external heat alone can enable the temperature in the various catalysis zones to be controlled, but in practice, distribution and arrangement of the active catalyst improves the adiabatic conditions.

It is known to be advantageous to dispose at the catalysis pipe inlet a chemically inert layer consisting only of the catalyst carrier.

In particular, the invention provides for this inert layer being followed by at least one zone containing a commercial catalyst which is diluted with an inert material. The ratio of dilution can, for instance, vary between 10% and 90% as a function of the characteristics of the product to be treated.

More particularly in the case of reforming petroleum fractions, the ratio of dilution will depend on the origin of the crude oil used and the octane number required in the gasoline recovered after the reaction.

In the examples given hereinafter various degrees of catalyst dilution will be given, taking into account the spatial velocity, i.e., the relation between the flow of feedstock and weight of the active catalyst.

It is advantageous to combine the arrangement of a dilute catalyst zone and empty zones separating the catalysis zones proper. In all cases the undiluted commercial catalyst zone is disposed in the last zone reached by the reaction stream.

Owing to the arrangement of the catalyzer smaller deviations are obtained with respect to the adiabatic conditions than in prior processes, even without modifying the supply of local external heat, and this with higher feedstock flows. In other words, the means of the invention enable the spatial velocity to be increased while obtaining yields at least as high as those of the prior art.

Similarly, with respect to conventional catalytic reforming conditions and for the same operating temperatures, the invention enables yields of substantially higher octane numbers, or greater yields of aromatic compounds to be obtained.

It should also be noted that, in an apparatus using the means of the invention, the pressures within the catalyst zones are lower than in conventional apparatus because there is less pressure drop within the pipes. This can be explained by the fact that, owing to the arrangement of the catalyst of the invention, and to the various intermediate furnaces and reactors being done away with, the petroleum fractions follow a shorter path.

Another advantage of the invention is that the working conditions of the catalyst are more even, and therefore, there is less wear of catalysts.

In a form of embodiment of the invention suited to industrial applications, the heating means provided along the reactor zones are burners known as radiants.

Figure 1:
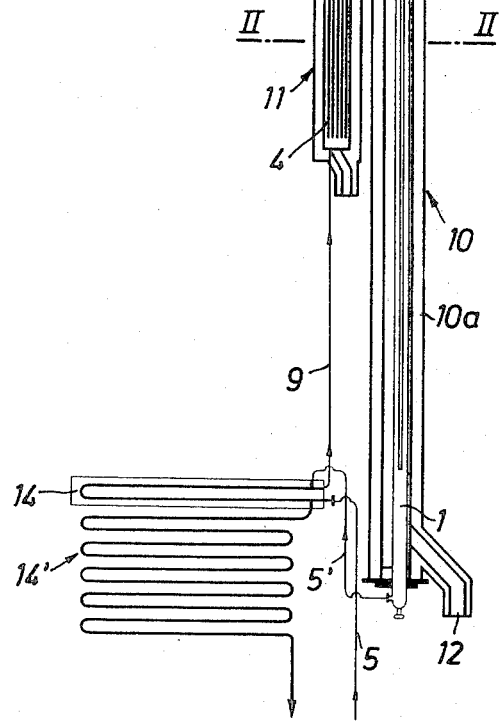
FIG. 1 is a diagrammatic, axial cross-sectional view of one embodiment of a catalytic reformer with its associated equipment.

An example of the apparatus used in this case will be described hereinafter with reference to the appended drawings in which:

FIG. 1 is a diagrammatic, axial cross-sectional view of the catalytic reformer with its associated equipment.

FIG. 2 is a larger scale transversal cross-sectional view along line II—II of FIG. 1.

Figure 3:
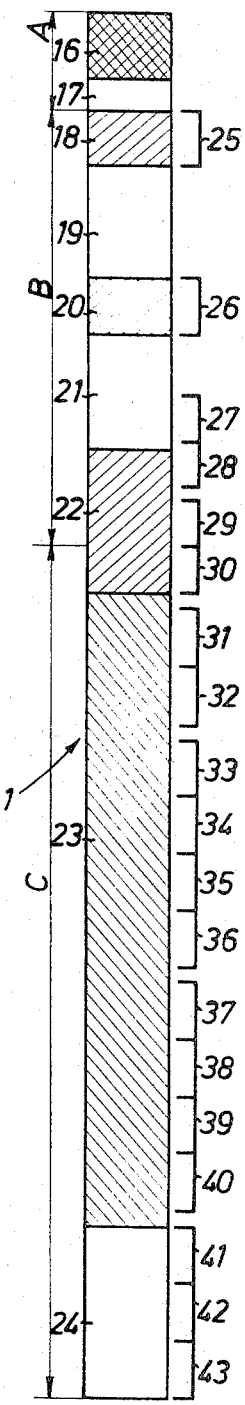
FIG. 3 is a view of a catalyst tube with the various reaction zones and associated radiant heating means.

FIG. 3 is a view of a catalyst tube with the various reaction zones and associated radiants.

Figure 4:
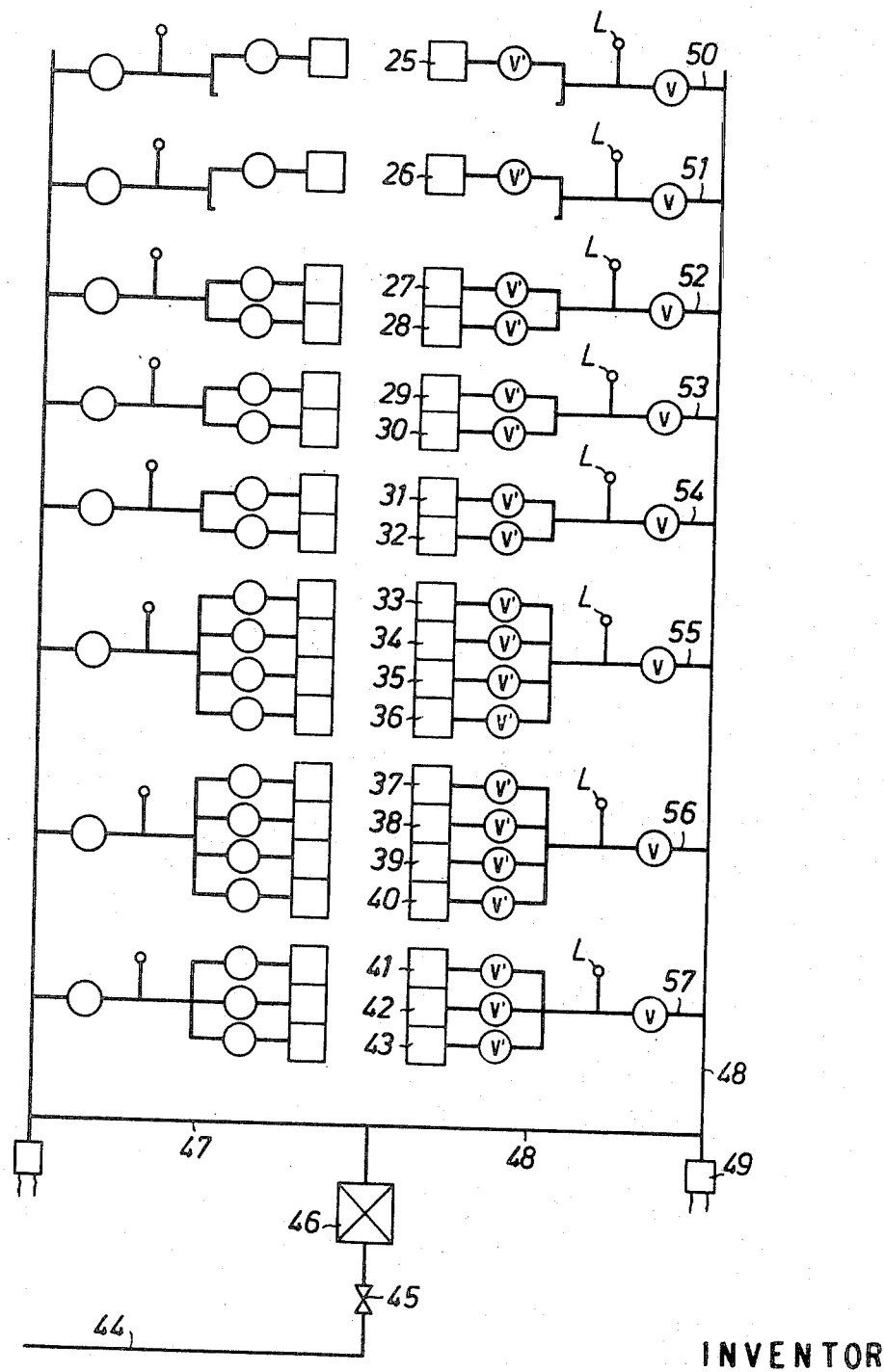
FIG. 4 is a diagram of the fuel supply system of the radiant heating means corresponding to the arrangement of FIG. 3.

FIG. 4 is a diagram of the fuel supply system of the radiants corresponding to the arrangement of FIG. 3.

Figure 5:
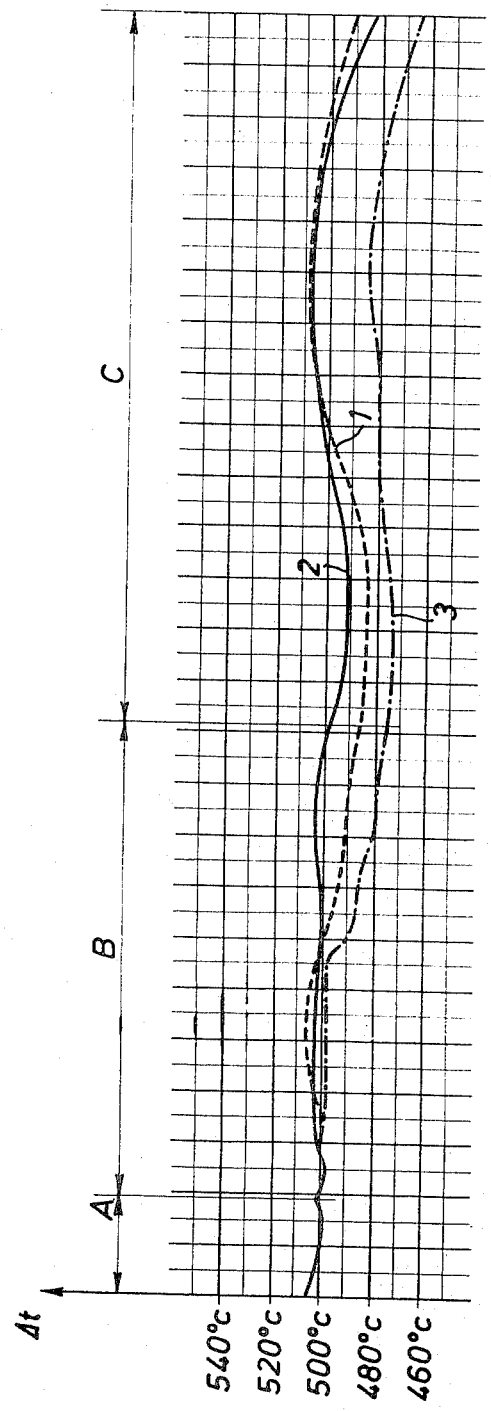
FIG. 5 is a comparative graph showing the evolution of temperatures along a catalyst tube according to the invention, when an inert gaseous feedstock and a feedstock subjected to reaction are flowed through the tube.

FIG. 5 is a comparative graph showing the evolution of temperatures along a catalyst tube according to the invention, when an inert gaseous feedstock and a feedstock subjected to reaction are flowed through the tube both adiabatically and non-adiabatically.

The apparatus shown diagrammatically in FIG. 1 comprises a reactor designated by the general reference number 10, this reactor constituting an elongated furnace having a rectangular cross-section (FIG. 2). In a known manner, the walls 10a of the furnace are lined with a refractory, insulating material in the portions where there are no radiant burners. It will be noted (FIG. 2) that the width of the furnace, seen in cross-section, is small compared with its length which is several tens of times longer than its width, the cross-section of the furnace having, therefore, the appearance of a flattened rectangle. The furnace is placed in the vertical position shown in FIG. 1, and its height corresponds substantially to that of the catalyst tubes 1. At the lower portion thereof are provided expansion valves (reference 12) and at the upper portion a chimney 13 for the evacuation of stack-gases.

In FIG. 1 there is shown a single catalyst tube 1 with the diagrammatical arrangement of the reaction zones proposed by the invention. This arrangement will be illustrated in greater detail with reference to FIG. 3.

The longitudinal walls of the furnace carrying radiants 2, 3 distributed into heating zones on certain portions of the height of the furnace (see FIG. 3), in transversal cross-section (FIG. 2), it is seen that in the heating zones the radiants 2 and 3, respectively, are disposed side by side along the entire length of the furnace. Radiants 2 and 3 are, therefore, disposed in two parallel rows, the catalyst tubes 1 extending between the said rows. The arrangement is such that a radiant of a row 2 is masked, at least partially and preferably quasitotally, by a catalyst tube 1 opposite a radiant 3 of the other row, whereby the heat flux emitted by one row of radiants does not reach the other row, and vice-versa.

The catalyst tubes 1 are thus placed between the two rows of radiants 2 and 3. A simple arrangement of the catalyst tubes 1 is shown in FIG. 2. Tubes 1 are divided into two rows illustrated by lines a—a and b—b and disposed in staggered array with respect to each other, one tube of row a—a being situated between two tubes of the other row b—b and vice versa. Owing to this arrangement each tube receives the maximum heat flux radiated by the radiant burners and, at the same time, the distribution of this flux is as homogeneous as possible in a planar section of the tube, perpendicular to the axis thereof. Under these conditions, there results a quasi-elimination of heat disparities and, consequently, local overheating.

The means associated with furnace 10 will now be described with reference to FIGS. 1 and 2.

A preheating furnace 11 is shown diagrammatically in FIG. 1. It comprises a nest of tubes 4 for reheating the feedstock (recycling gas+hydrocarbon, such as naphtha which has been subjected to desulfurization in a known desulfurization unit, not shown).

As furnace 10, the reheater 11 has a flattened rectangular cross-section (FIG. 2). Tubes 4 are distributed along two parallel vertical planes and are disposed between two rows of radiants 7 and 8. The disposition of tubes 4 with respect to one another and opposite radiants 7 and 8 in the preheater 11 can advantageously resemble that of tubes 1 and radiants 2 and 3 in furnace 10.

One or more exchangers 14 and coolers 14', of the double tube type, for instance, receive through line 5' the gaseous effluents discharged at high temperature at the lower portion of furnace 10. These effluents exchange their heat with the feedstock entering into service and introduced at 5. Then the effluents, already precooled in this manner, finish their cooling in the water circulation cooler 14, for example, before being evacuated.

The feedstock entering service is evacuated from the exchanger 14 by pipe 9 and is taken to the preheating furnace 11 which finishes vaporization of the hydrocarbon and raises the whole of the feedstock to about the temperature selected for the reaction in furnace 10 into which it enters by tube 6. The heat exchanger 14 and preheating furnace 11 enable the adjustment of the feedstock temperature at the value desired for entering into the reactors and, if desired, to vaporize naphtha, if the latter is liquid as it enters into the equipment. The fumes or stack gases leaving chimneys 13 and 15 of furnaces 10 and preheaters 11 are used to produce steam in a boiler, not shown, or for any other use.

The use of the available heat energy is adapted to requirements by those skilled in the art. According to the temperature and volume of the gaseous effluents evacuated from the lower portion of furnace 10 and the characteristics of exchangers 14, 14', it is possible to adjust the preheater 11, by controlling radiants 7, 8 so as to completely vaporize the naphtha if the same has been precooled and stored after desulfurizing and convey it to 6 at the temperature selected to introduce it into the catalysis zone.

The arrangement of the radiants along the height of a catalyst tube 1 and their supply will now be described referring to FIGS. 3 and 4.

In FIG. 3, the catalyst tube 1 is divided up in a special manner according to the invention and comprising successively downwardly:

a layer 16 filled with inert pellets or marbles constituted solely by the catalyst support,
a material-free space 17,
a layer 18 containing an active catalyst filler and inert support, the active catalyst representing about 33% by volume of the total volume of this layer,
a material-free space 19,
a layer 20 with an active catalyst in a proportion of about 33% by volume based on the total volume of this layer,
a material-free space 21,
a layer 22 with an active catalyst in a proportion of about 33% by volume based on the total volume of this layer,
a layer 23 containing 100% active catalyst on a support,
a terminal material-free space 24.

The relative sizes of these various spaces and layers are shown in their real size in FIG. 3, it being understood that their vertical dimensions will vary in proportion with the real height of the tube.

To simplify, a single catalyst tube has been shown. The other tubes 1 of furnace 10 are arranged in an identical manner.

FIG. 3 also shows three zones A, B, and C which will be described in greater detail hereafter with reference to FIG. 5.

The heating radiants are disposed opposite tube 1. From bottom to top there is found, successively:

a radiant 25 opposite layer 18,
a radiant 26 opposite layer 20,
four radiants 27 to 30 opposite layers 21 and 22,
ten radiants 31 to 40 opposite layer 23,
three radiants 41 to 43 opposite space 24.

Furnace 10 also contains batteries of radiants disposed in zones by being stacked along the height of the furnace.

In the example of embodiment selected, the tube is a 3½" sch 40 tube (as in installations for treating petroleum hydrocarbons). Radiants are used whose surface of radiation is a rectangle of about 20 x 14 cm., which are manufactured and are available on the market under the name "R15 brique." Obviously, other types of radiants could be used.

For economical reasons, it is advantageous to use radiants of the same type. For reasons of simplicity, there has only been shown, FIG. 3, one vertical line of radiants disposed along tube 1. Obviously, another line of radiants exists positioned opposite the first, as has previously been been explained with reference to FIG. 2. This second line is not shown in FIG. 3, but has been shown in FIG. 4, which is a diagram of the fuel supply to the radiants.

As shown in FIG. 4, a common pipe 44 constitutes the main supply of fuel, which can be light petroleum, natural gas, town gas, propane, butane, kerosene, diesel oil, or another known fuel for supplying radiants, premixed or not with the air necessary for its combustion. The type of radiants is obviously adapted to the fuel used. A stop-valve 45 is positioned on conduit 2 and a regulating valve 46 controls fuel flow. From valve 46, the flow of fuel separates into two portions 47 and 48 to supply the two lines of radiants respectively.

The portion of the supply device for the line of radiants positioned opposite radiants 25 to 43 is absolutely identical to that of the line of radiants 25 to 43. It is therefore not necessary to describe it in detail.

Only the supply of radiants 25 to 43 from conduit 48 will be described. Diagrammatically the reference 49 shows a security head which, through a servo-device, not shown, permits automatic cutting off of the fuel supply in case of incidents.

Secondary pipes 50 to 57 are connected to pipe 48. On each of these pipes are mounted a valve V, such as the punch cock type, and one manual control member per group of radiants. The manual control member is diagrammatized by a valve L. The individual control of each of the radiants 25 to 43 is ensured by valves V'. The groups of radiants are associated as shown in FIG. 4.

The radiants used in the process of the invention provide numerous practical advantages.

First of all, they provide great flexibility for the operation of the installation. For example, if it is required to increase the heating power, the radiants can be changed and more powerful radiants used, or while retaining the same radiants, additional radiants can be positioned at the positions left free between those which have already been mounted and which have been previously described.

A same type of radiants permits the heating power to be varied within broad limits. For the particular type of radiants "R15 brique" used in the mode of embodiment described, the unitary power can vary between 1500 and at least 8000 to 10,000 cal./h., and in average conditions, it is from about 3000 to 5000 cal./h.

Furthermore, owing to the use of radiants, the catalyst tubes resist thermal stresses better. Owing to the individual feeding of the radiants associated with one tube, it is easy to continue to operate the furnace even if one tube is out of use. It is then only necessary to stop the supply to the vertical line of the radiants corresponding to the damaged tube.

It will also be noted that the radiants enable very flexible operation of the preheater 11. The effluents from the catalyst reactor provide an important part of the thermal energy necessary for preheating the feedstock. Radiants 7, 8 are supplementary sources of heat and are used for control. It is indeed very easy to control the supply rate of the radiants, that is to say, their heating power, to the feedstock output temperatures, so that the last is as near as possible to the optimal input temperature in reactor 10.

The use of radiants is, therefore, advantageous both in a furnace whose tubes do not contain a catalyst, as the preheater 11, as in a furnace type reactor 10.

In a catalyst tube arranged according to the invention, it permits, for a certain time, to palliate wear of the catalyst in its upper portion by accepting the shifting towards the bottom of the tube of the main reactivity zone on pure pure catalyst. This is the reason why radiants 41, 42, 43 are provided.

Finally, owing to the use of a larger number of radiants than are strictly necessary, it enables the system to be adjusted to different operational rates, but also, and above all, to obtain thermal densities on the tubes which can vary within wide proportions. It is thus possible to obtain very variable transfer levels and, consequently, very diverse differences in temperatures between the inner feedstock and the wall, which can descend to only a few degrees if necessary.

These radiants have the following characteristics:

no naked flames liflely to lick the tubes and, therefore, no untimely local overheating;
radiation yields ranging from 55 to 60% to 70 to 75% (the latter being obtained on higher calorific power), with respect to useful heat, according to the operating temperature, are obtained;
the possibility of producing almost complete dissociation in the furnace of the action of the fumes by convection and radiation and, therefore, the possibility of a very exact determination of heat;
the radiation is geometrically well defined as the burner itself has a well defined geometrical form. The heat emitted by radiation being very directional (about 85% of the total radiated heat is situated in the volume generated by a straight line bearing on the contours of the transmitter and forming 30° with the normal thereof), it is in fact possible, owing to the separate supply of fuel per burner (or group of burners) to effectively control the amount of heat supplied to the tube opposite each burner (or group of burners); large variations of the power consumed (from 1 to 6 or 7).

An example of a practical embodiment of the process of the invention, which is used in the apparatus shown in the appended drawings and described hereinabove, will now be given.

EXAMPLE 1

The invention is applied to naphtha reforming and 40 kg./h. of naphtha feedstock per tube, for example, can be treated with a volume of 45 m.³/h. recycling gas containing approximately 75% hydrogen, the remainder consisting of various light hydrocarbons (notably methane) formed during reactions and not evacuated at cooling. The feedstock can comprise up to 65/70 kg./h. and the recycling gas up to 175 m.³/h. per each feedstock.

Heating of the feedstock and vaporization of the hydrocarbon portion require 25,000 cal./h. for the tonnages given:

About half is provided in exchanger 14 by the effluents evacuated from the reaction. (These are cooled in this manner to 270° C. and then to 20° C. by water cooler 14'.)

The second half is provided by preheater 11 which consists of a certain number of ⅜" sch 40, 2 m. length tubes—five tubes of the preheater are necessary to heat the feedstock for tube 1 of the reactor furnace 10 from 260° C. to 525° C.

These tubes, positioned vertically as described hereinabove, are heated by radiants developing an average power of 3000 cal./apparatus. Emission temperature is about 890° C. and 8 radiants are disposed at 7 and 8 permitting five tubes of the preheater to be heated twice.

Each reactor tube 1 has a length of 6 m. and is equipped as has been described hereinabove. The respective heights of the different zones and layers defined in FIG. 3 are as follows:

|  | Cm. |
| --- | --- |
| Layer 16 | 20 |
| Space 17 | 18 |
| Layer 18 | 25 |
| Space 19 | 43 |
| Layer 20 | 25 |
| Space 21 | 43 |
| Layer 22 | 67 |
| Layer 23 | 270 |
| Space 24 | 90 |

The mean spatial velocity (LHSV) per hour, i.e., the volume of liquid feedstock/h. based on the weight of the catalyst has been taken as about 2.5. 32 radiants are used (16 on each side) for two heating tubes, three being in reserve, as previously stated. This number is greater than is strictly necessary. But it is defined not only by the amount of heat to be supplied (which is approximately 25,000 cal./h. and per tube on an average and can be higher than 30,000) but also by desire to ensure good distribution of heat along the whole length of the reactor. Furthermore, more flexibility is available for more intense operation.

To treat 2,500 kg./h. of feedstock, it is necessary to have 60 tubes similar to those described, and the heat is applied to the furnace by 896 radiants (for constructive reasons).

In section A of the tube, the heat to be applied is 0%; in section B of the tube, the heat to be applied is 25%, and in section C of the tube, the heat to be applied is 75%, of the total heat in the three cases.

FIG. 5 illustrates the operability of the invention. This figure is a diagram in which the axis of the ordinates corresponds to the axis of the catalyst tube 1 shown in FIG. 3, the temperature being given in abscissa so that the zero-point is defined by the mean reaction temperature, which lies between 480° C. and 530° C. and which, in the example chosen, is 500° C. On either side of the zero point, the temperature divergences $\Delta t$ are inscribed. On such a diagram it is possible to follow the temperature divergences in the various reaction zones with respect to the temperature.

The diagram shows the curve 1 obtained without feedstock, that is to say, the rate of the evolution of temperature along the catalyst tube wherein a non-reactive gas (normal heptane) has been flowed without a reaction occurring.

Curve 2 shows the rate of the evolution of temperature along the catalyst tube in which naphtha has been flowed, the reforming reaction then being carried out according to the invention.

Curve 3 gives the evolution of temperature in the case of the operation of the reactor not being adiabatic.

Comparison of the curves enables the following conclusions to be drawn:

(a) In the exact temperature adjustment zone (zone A above the catalyst), there is neither a quasi-isothermic nor a quasi-adiabatic reaction, but this condition is not sought as it is not a reaction zone;

(b) In zone B (first top portion of the reactor) which is, in general, a zone where fairly high endothermic conditions exist, quasi-adiabatic conditions are obtained by the control of reactional endothermicity owing to the arrangement and the concentration of the catalyst.

Therefore, there is not essentially an exchange of calories with the exterior owing to the fact of the reaction itself. The supply of calories only comes into play to compensate the exterior heat losses and, of course, owing to adiabatically being obtained more or less perfectly (quasi-adiabaticity).

(c) The preceding zone B represents only ¼ to ⅓ of the total height of the reactor. The remainder (zone C), operating under quasi-adiabatic conditions, the supply of calories compensates essentially for the exterior calorific losses as would a perfectly efficient heat insulator.

The line of curve 3 shows the evolution of temperatures in the case of the reaction being non-adiabatic. It is seen that these temperatures fall very much lower than the value which has been chosen for the reaction.

It is evident that the invention can be applied to any type of catalyst suitable for the catalytic reforming reaction. As examples, known catalysts corresponding to the requirements of the invention are:

the Sinclair Baker catalyst, type RD 150C with 0.35% platinum on an alumina carrier,
the catalysts available in France under the name "Procatalyse" type RG 404 or RG 414 of 0.6% and 0.35% platinum, respectively, on an alumina carrier.

These catalysts are suited for reforming in a hydrogenated environment.

Likewise, an example has already been given of a special arrangement of radiants along the catalyst tube. This arrangement is adapted to the distribution of the catalyst in the tube, but it can obviously be modified to make allowance for another arrangement of the catalyst and the reactivity of the specifically treated hydrocarbon feedstock.

The invention will be further illustrated without limitation by the following examples which relate to a catalytic reforming treatment of a petroleum fraction obtained from crude oils from the Middle East, the Sahara, or mixtures thereof.

Trials were carried out in a reactor tube 2 m. in length and having an inner diameter of 4.5 cm.

This tube was separated into six independent sections heated individually by radiantly heated padding. The sizes of the six sections were as follows:

| | Length, cm. |
|---|---|
| 1st section | 25 |
| 2nd section | 25 |
| 3rd section | 25 |
| 4th section | 25 |
| 5th section | 50 |
| 6th section | 50 |

In all the trials the feedstock was introduced cold and the first heating section was raised to a temperature enabling the feedstock to be vaporized.

The notations used in the remainder of the specification will now be defined.

The spatial velocity is the quotient of the flow rate of feedstock (in liters/hr.) by the weight of active catalyst (in gm./hr.).

The data designating adiabatic value are the maximum deviations separating the measured effective temperature in the catalysis zone studied, either to a lower or higher degree, from the theoretical temperature. These data are given both for trials carried out in substantially adiabatic conditions and in non-adiabatic conditions.

In all the trials the working pressure was 25 bars and the recycling of gases was fixed at 1 Nm.$^3$/h.

A series of trials was carried out varying the spatial velocity and the temperature.

The flows of feedstock used were selected as being equal to 1.2 l./hr., 2.4 l./hr., and 3 l./hr. The catalyst consisted of alumina balls acting as a carrier for the active catalytic substances proper. The catalyst used was that commercially available as "RD 150C" (Sinclair Baker). "RD 150C" is a special catalyst for hydroreforming containing 0.35% Pt on an alumina carrier having a specific area of several hundreds of square meters per gram.

Dilution of the catalyst was obtained by carefully mixing the catalyst at 100% and Al$_2$O$_3$ balls alone in the desired proportions.

All of the following figures are given for cylindrical catalyst zones having an inner diameter of 45 mm.

EXAMPLE 2

A distribution (Total length of the catalyst zone 1.25 m.)

A neutral zone consisting of Al$_2$O$_3$ balls alone (length 0.53 m.)+one catalyst zone at 100% (the remainder of length).

EXAMPLE 3

B distribution (Total length of the catalyst zone 1.25 m.)

A neutral zone (0.53 m.)+an empty zone (0.12 m.)+a 100% catalyst zone (the remainder).

EXAMPLE 4

C distribution (Total length of the catalyst zone 1.35 m.)

A neutral zone (0.53 m.)+an empty zone (0.12 m.)+a 50% catalyst zone (0.07 m.)+an empty zone (0.12 m.)+a 50% catalyst zone (0.19 m.)+a 100% catalyst zone (0.97 m., in the remainder).

EXAMPLE 5

D distribution (Total length of the catalyst zone 1.35 m.)

A neutral zone (0.53 m.)+an empty zone (0.12 m.)+a 25% catalyst zone (0.07 m.)+an empty zone (0.12 m.)+a 50% catalyst zone (0.19 m.)+a 100% catalyst zone (the remainder).

EXAMPLE 6

E distribution (Total length of the catalyst zone 1.42 m.)

A neutral zone (0.53 m.)+an empty zone (0.05 m.)+a 33% catalyst zone (0.05 m.)+an empty zone (0.12 m.)+a 33% catalyst zone (0.05 m.)+an empty zone (0.12 m.)+a 33% catalyst zone (0.13 m.)+a 100% catalyst zone (the remainder).

The following spatial velocities were obtained for the five distributions given above, and with the aforesaid flow of feedstock:

| Flow 1 hour | Distribution of the catalyst | Spatial velocities |
|---|---|---|
| 1.2 | A | 0.81 |
| 1.2 | D | 0.98 |
| 2.4 | B | 1.62 |
| 2.4 | B | 1.62 |
| 2.4 | C | 1.84 |
| 2.4 | D | 1.96 |
| 2.4 | E | 2.4 |
| 3.0 | E | 2.55 |

Furthermore, the temperature was varied selecting three values close to the conventional temperatures used in catalytic reforming, i.e., 480° C., 505° C., and 509° C.

Comparative trials were also carried out with the distribution of catalyst A at 505° C. and a spatial velocity of about 0.8 (for a flow of 1.2 l./hr.).

The results of the tests for each of the aforementioned temperatures are given in the appended Tables I, II and III.

TABLE I $t=480°$ C

| | Volumetric mass | Approximate yield (vol.) | NO clear [1] | NO 0.5 Pb [2] | Percent aromatic | Aromatic yield (vol.) | Naphthenes, percent | Adiabatic value, ° C |
|---|---|---|---|---|---|---|---|---|
| Distribution A: | | | | | | | | |
| AD | 0.776 | 83.3 | 96.9 | 101.4 | 59 | 48.1 | 0 | +15, −30 |
| NAD | 0.773 | 91.6 | 88.0 | 96.9 | 44 | 40.3 | 2 | −60 |
| 0.81 vs: | | | | | | | | |
| AD | 0.768 | 90 | 90.8 | 98.8 | 49 | 44.2 | 5 | +22, −10 |
| NAD | 0.769 | 90.8 | 88.3 | 97.2 | 43 | 39.0 | 9 | −10, −50 |
| Distribution B: | | | | | | | | |
| 1.62 vs: | | | | | | | | |
| AD | 0.778 | 89 | 87.7 | 96 | 59 | 52.5 | 5 | +5, −35 |
| NAD | 0.774 | 97 | 62.8 | 79.6 | 34 | 33.0 | 0 | +5, −45 |

[1] NO clear= Research octane number without Pb.
[2] NO 0.5 Pb= Research octane number with 0.5% Pb.

Note.—vs=Spatial velocity; AD=Adiabatic; NAD=Non-adiabatic.

TABLE II t=505° C

| | Volumetric mass | Approximate yield (vol.) | NO clear [1] | NO 0.5 Pb [2] | Percent aromatic | Aromatic yield (vol.) | Naphthenes, percent | Adiabatic value, ° C. |
|---|---|---|---|---|---|---|---|---|
| Distribution A: 0.81 vs: | | | | | | | | |
| AD | 0.784 | 76.8 | 100.4 | 105.2 | 69 | 53 | 0 | 0, −30 |
| NAD | 0.771 | 86.2 | 92.4 | 99.4 | 50 | 43.3 | 0 | +10, −30 |
| Distribution D: 0.98 vs: | | | | | | | | |
| AD | 0.783 | 81 | 99.2 | 103.5 | 50 | 41 | 0 | +5, −15 |
| NAD | 0.772 | 93 | 78.4 | 89.5 | 37 | 34 | 6 | 0, −50 |
| Distribution E: 2.4 vs: | | | | | | | | |
| AD | 0.785 | 84 | 94 | 99.3 | 50 | 42 | 0 | 0, −10 |
| NAD | 0.782 | 90 | 76.6 | 88.1 | 40 | 36 | 23 | −5, −40 |
| Distribution E: 2.55 vs: | | | | | | | | |
| AD | 0.792 | 79 | 95.1 | 99.0 | 56 | 44 | 0 | +5, −.5 |
| NAD | 0.773 | 93 | 68.4 | 81.7 | 42 | 39 | 0 | −5, −45 |

[1] NO clear = Research octane number without Pb.
[2] NO 0.5 Pb = Research octane number with 0.5% Pb.

NOTE.—vs = Spatial velocity; AD = Adiabatic; NAD = Non-adiabatic.

TABLE III t=509° C

| | Volumetric mass | Approximate yield (vol.) | NO clear [1] | NO 0.5 Pb [2] | Percent aromatic | Aromatic yield (vol.) | Naphthenes, percent | Adiabatic value, ° C. |
|---|---|---|---|---|---|---|---|---|
| Distribution B: 1.62 vs: | | | | | | | | |
| AD | 0.790 | 66 | 100.5 | 104.4 | 71 | 46.9 | 7 | +20, −20 |
| NAD | 0.781 | 70 | 91.5 | 98.5 | 68 | 47.6 | 13 | 0, −45 |
| Distribution C: 1.84 vs: | | | | | | | | |
| AD | 0.787 | 98 | 99.3 | 101.6 | 66 | 49.5 | 10 | 0, −25 |
| NAD | 0.778 | 75 | 81.0 | 91.6 | 43 | 42.1 | 0 | 0, −55 |
| Distribution D: 1.96 vs: | | | | | | | | |
| AD | 0.787 | 95 | 98.5 | 103.7 | 65 | 52.6 | 1 | +10, −5 |
| NAD | 0.775 | 81 | 82.0 | 92.8 | 46 | 43.7 | 0 | 0, −55 |

[1] NO clear = Research octane number without Pb.
[2] NO 0.5 Pb = Research octane number with 0.5% Pb.

NOTE.—vs = Spatial velocity; AD = Adiabatic; NAD = Non-adiabatic.

The present invention represents an improvement over the prior art in that it positively utilizes a controlled addition of heat, which addition is determined by the temperature variation in the reaction stream. By its design, the process of the invention is limited to endothermic reactions which should be conducted under adiabatic conditions. The heating system of the present invention is of the radiant type, either by an electric resistance wire or a transfer of radiant energy by other radiant means. The process is applicable to various numbers of reactor tubes, and it avoids the necessity of successive reheating of the reaction stream. The process, therefore, creates a wide range of independence in design and building of the various elements of the reactor apparatus. The reactor tubes do not require any specific shape or arrangement, and do not require a specific inner arrangement of the tubes. The process of the invention insures a good heat distribution at the various heating zones of the reactor tube, and consequently, the risk of hot points or local overheating is considerably limited. As a further improvement, the catalyst bed can be arranged to facilitate the correct addition of heat lost during the reaction. This arrangement causes a flattening of the heat required over the course of the tubular reactor to maintain adiabatic conditions. However, the catalyst arrangement does not require a strict, careful distribution or an arrangement according to previous calculations with respect to bed thickness in connection with the amount of heat input. Any commercial catalyst can be utilized provided that it is adapted to the catalytic process being conducted.

The preceding specific embodiments are illustrative of the practice of the invention. It is to be understood, however, that other expedients known to those skilled in the art may be utilized without departing from the spirit of the invention or the scope of the appended claims.

I claim:

1. A process for conducting endothermic catalytic reactions in elongated reactors under substantially adiabatic conditions which consists essentially of passing a petroleum fraction reaction stream into an elongated continuous, vertically arranged confined reaction path having at least one catalyst zone, dividing the exterior of said elongated confined reaction path into a plurality of separate zones, each of said separate zones having at least two independently controlled radiant heating means in cooperation therewith and adapted to supply variable amounts of heat solely by radiation through the exterior of said elongated confined reaction path to said reaction stream, at least one temperature sensing means located in said reaction stream in each of said plurality of separate zones, each of said temperature sensing means being in cooperation with each of said at least two independently controlled radiant heating means in each of said separate zones and controlling the heat output of said radiant heating means, whereby the temperature of said reaction stream is maintained between 470° C. and 520° C. at a substantially constant value equal to a predetermined value during its passage through said elongated continuous, vertically arranged confined reaction path.

2. The process of claim 1 wherein said independently controlled radiant heating means are radiant burners.

3. The process of claim 1 wherein said confined reaction path has a plurality of catalyst zones, each of said zones being separated from adjacent zones by a free space.

4. The process of claim 3 wherein the first members of said plurality of catalyst zones contain a lower concentration of active catalyst on an inert catalyst carrier material than the remaining members of said plurality of catalyst zones.

5. The process of claim 4 wherein said concentration of active catalyst in said first members of said plurality of catalyst zones is from 10% to 90% of the active catalyst concentration in the remainder of said plurality of catalyst zones.

6. The process of claim 1 wherein said at least one catalyst zone in said elongated confined reaction path is preceded by a zone containing inert catalyst carrier material.

References Cited

UNITED STATES PATENTS

| | | | |
|---|---|---|---|
| 2,943,998 | 7/1960 | Decker | 208—65 |
| 3,198,727 | 8/1965 | Lifland | 208—79 |
| 2,638,879 | 5/1953 | Hess | 23—288 M |
| 3,031,293 | 4/1962 | Meissner | 75—26 |
| 3,062,197 | 11/1962 | Fleischer | 23—288 M |
| 2,751,893 | 6/1956 | Permann | 23—288 M |
| 3,274,978 | 9/1966 | Palchik et al. | 23—288 M |
| 2,474,014 | 6/1949 | Seebold | 260—680 |

HERBERT LEVINE, Primary Examiner

U.S. Cl. X.R.

23—288 M; 122—356; 208—65, 79, 138, 146, DIG. 1